United States Patent Office 3,485,317
Patented Dec. 23, 1969

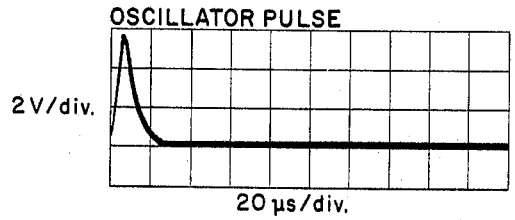
Fig.4 (A) OSCILLATOR PULSE
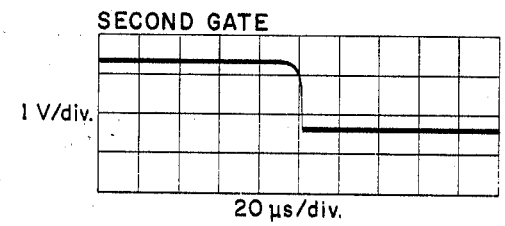
Fig.4 (F) SECOND GATE
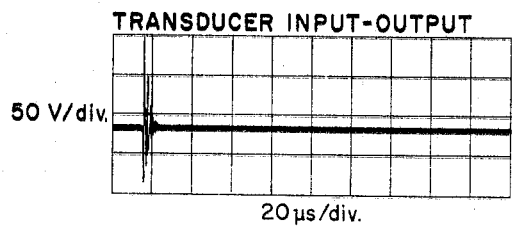
Fig.4 (B) TRANSDUCER INPUT-OUTPUT
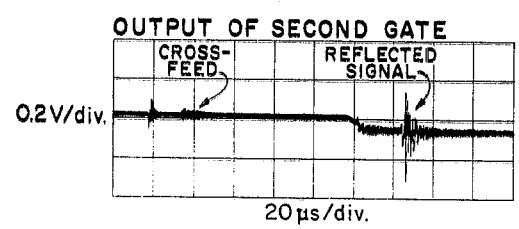
Fig.4 (G) OUTPUT OF SECOND GATE
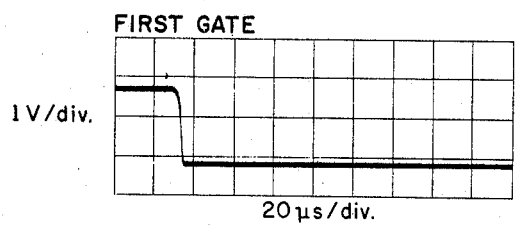
Fig.4 (C) FIRST GATE
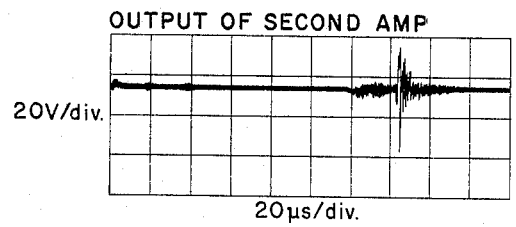
Fig.4 (H) OUTPUT OF SECOND AMP
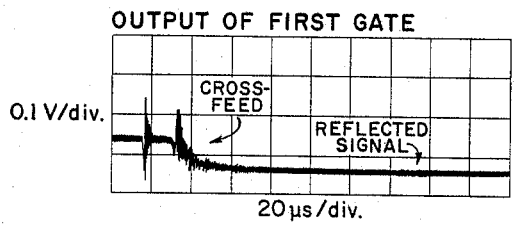
Fig.4 (D) OUTPUT OF FIRST GATE
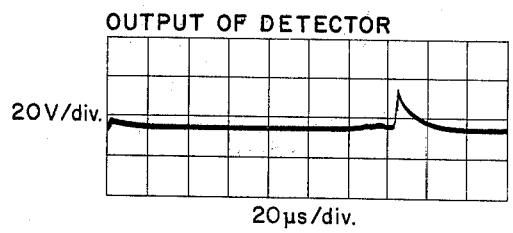
Fig.4 (I) OUTPUT OF DETECTOR
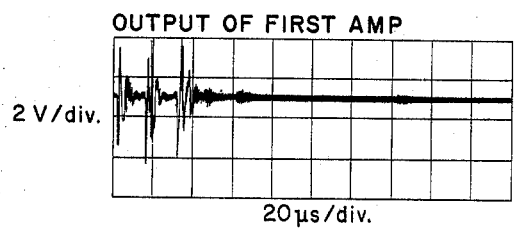
Fig.4 (E) OUTPUT OF FIRST AMP

3,485,317
CROSSFEED GATING SYSTEM FOR BOREHOLE TELEVIEWER
Arvindbhai S. Patel, Dallas, Tex., assignor to Mobil Oil Corporation, a corporation of New York
Filed Apr. 3, 1968, Ser. No. 718,511
Int. Cl. G10k *11/00;* G01v *1/40*
U.S. Cl. 181—.5                                17 Claims

ABSTRACT OF THE DISCLOSURE

The specification discloses a system for reducing the crossfeed of transmitter excitation into the receiver channel of a borehole logging system employing a transmit-receive electroacoustic transducer. The system is particularly adapted for a borehole televiewer logging system which produces a "picture" log of the inside surface of a borehole using acoustic energy. A first gate circuit in the receiver channel operates in response to the transmitter circuit to pass the reflected signal from the transducer but gate out or attenuate transmitter crossfeed. The output of the first gate circuit is amplified to a high level and then fed to a second gate circuit which again passes the reflected signal, but attenuates the transmitter crossfeed. The output of the second gate circuit contains a high amplitude received signal which is much larger than any transmitter crossfeed.

BACKGROUND OF THE INVENTION

In U.S. Patent No. 3,369,626, issued to Joseph Zemanek, Jr., there is described a logging system, referred to herein as the borehole televiewer, for producing pictures of the inside surface of wells and boreholes drilled in the earth. The present invention is an improvement in the borehole televiewer and similar systems, though it may have applications to other types of borehole logging systems.

In one form of the borehole televiewer, a beam of pulsed, high frequency acoustic energy is scanned through 360° of the inside surface of a borehole. Acoustic energy reflected from the rock structure or casing adjacent the borehole is received and converted into a corresponding electrical signal. A detector circuit then generates a portion of the envelope of the high frequency received signal. The detected signal is used to intensity modulate the beam of a cathode ray tube. The beam of the cathode ray tube is scanned in a raster in proportion to the rotational position and the depth of the downhole scanning acoustic beam. Thus, there results on the face of the cathode ray tube a visual representation of a folded-flat vertical segment of the inside surface of the borehole which may be photographed to produce a permanent record. The photographs of adjacent vertical segments of the borehole may be placed end to end to form a continuous "picture" log of the borehole.

In some designs of the borehole televiewer a single electroacoustic transducer is employed for both transmitting and receiving acoustic pulses. Because the transmitter circuit and the receiver channel are electrically coupled together at the transducer, the high voltage excitation from the transmitter circuit crossfeeds into the receiver channel and becomes unwanted noise.

SUMMARY OF THE INVENTION

The present invention provides a novel and improved system for reducing the crossfeed of transmitter excitation into the receiver channel in the borehole televiewer or other logging systems employing a transmit-receive transducer. A dual gating system is provided which successively attenuates, amplifies, and again attenuates the transmitter crossfeed and other noise in the receiver channel. A first gate circuit in the receiver channel operates in response to the transmitter circuit to pass the reflected signal from the transducer, but gate out or attenuate transmitter crossfeed. The output of the first gate circuit is amplified to a high level and then fed to a second gate circuit which again passes the reflected signal, but attenuates the transmitter crossfeed. The output of the second gate circuit contains a high amplitude received signal which is much larger than any transmitter crossfeed. The received signal may then be amplified to higher gain levels without the imposed restriction of transmitter crossfeed.

The present invention may employ either normally opened or normally closed gate circuits in the receiver channel. In the form of the invention employing normally opened gate circuits, the excitation of the transmitter is delayed until a gating waveform initiated by the transmitter circuit causes first and second normally opened gate circuits to become substantially closed. Thus, at the time the transmitter is fired, the first and second gate circuits have had time to become closed for maximum attenuation of transmitter crossfeed. Then after the bulk of the transmitter crossfeed has terminated, the two gate circuits are reopened to pass the reflected signal unattenuated. The second gate circuit, in a preferred mode of operation, is maintained closed for a longer period than the first gate circuit so as to attenuate any unwanted gating spikes caused by the reopening of the first gate circuit, and to attenuate any other noise in front of the received signal.

ADVANTAGES OF THE INVENTION

Several advantages flow from the use of the present invention:

(1) Maximum amplification of the received signal may be performed prior to the detection of the envelope of the received signal, thereby improving the dynamic range of the system.

(2) High quality logs may be obtained under adverse borehole and mud conditions where previously logs were very difficult or impossible to obtain.

(3) The resolution and picture quality of the logs is improved because of the improvement in signal-to-noise ratio.

BRIEF DESCRIPTION OF THE DRAWINGS

FIGURES 4(A)–4(I) are representations of oscilloscope traces for the waveforms which appear at the corresponding lettered points in the circuit schematic of FIGURE 2.

Figure 1:
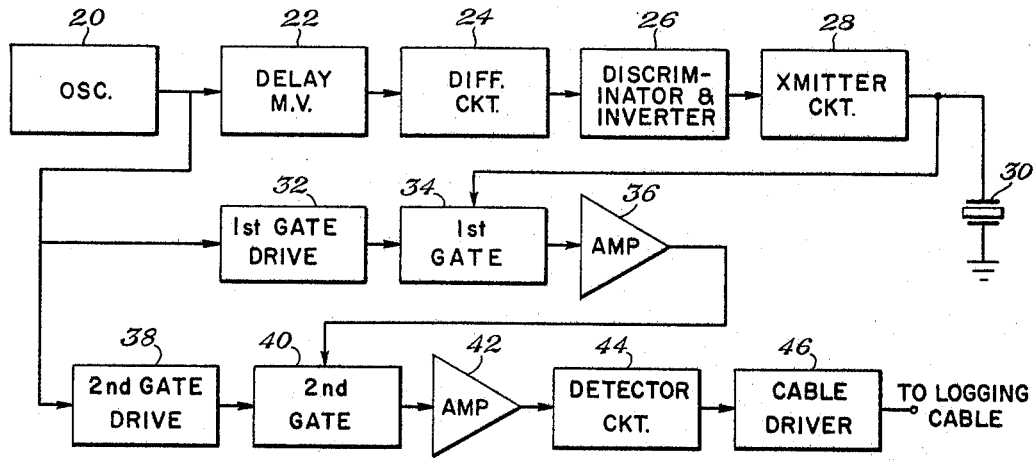
FIGURE 1 is a block diagram of one form of the invention employing normally open gates.

Block diagram—FIGURE 1

Referring to FIGURE 1 there is shown a block diagram of one form of the present invention employing normally open gates. The system shown is particularly adapted for use in the borehole televiewer system described above, but it may have other applications for other acoustic pulse borehole logging systems.

An oscillator or pulse source 20 generates a series of pulses which trigger a transmitter circuit 28 to excite electroacoustic transducer 30 to generate acoustic pulses at a high repetition rate. Transducer 30 may be adapted to generate a narrow beam of sonic energy and may be rotated about a logging tool to scan the inside surface of a borehole.

Reflected sonic pulses may also be detected by transducer 30 and converted into electrical pulses. Since a single transducer is used for both transmitting and receiving of acoustic pulses, the electrical excitation for the transmitted pulse crossfeeds into the receiver channel. Therefore, in accordance with the present invention the transmitter pulse crossfeed is successively attenuated, amplified, and again attenuated by use of a dual gating system including normally open gates 34 and 40. Pulses from oscillator 20 are fed to a first gate drive unit 32 which produces a gating waveform (FIGURE 2(E)) that closes the first gate 34 during the period of the transmitter crossfeed.

All electronic gates employing semiconductor devices require a finite time for closing in response to a gating waveform. Therefore, to minimize the amount of transmitter crossfeed passing through gate 34, it is closed before the transmitter is fired. This is accomplished by delaying the pulses from oscillator 20 from triggering the transmitter circuit 28 for a period of time until the first gate 34 is substantially closed. The delay circuit includes a delay monostable multivibrator 22, a differentiating circuit 24, and a discriminator and inverter circuit 26. In response to the pulses from the oscillator 20, delay multivibrator 22 produces a rectangular delay pulse (FIGURE 2(B)), which is fed to the differentiating circuit 24. The differentiating circuit 24 produces a positive-going spike from the leading edge of the input square wave and a negative-going spike from the trailing edge (FIGURE 2(C)). The discriminator and inverter circuit 26 then inverts all of the negative-going spikes and rejects the positive-going spikes (FIGURE 2(D)). Thus, there is produced from the output of circuit 26 a string of pulses which is delayed in time from the corresponding oscillator pulses for a period equal to the time constant of delay multivibrator 22. The delayed pulses then are used to trigger the transmitter circuit 28.

Even though the first gate 34 substantially attenuates the transmitter crossfeed, the amount of crossfeed which leaks through the gate may still be large compared to the returned signal. Therefore, the signal from the output of the first gate 34 is amplified in amplifier circuit 36 and fed to a second gate 40 for further attenuation of the crossfeed. This second gate 40, which is normally open, is closed by the gating waveform (FIGURE 2(F)) from a second gate drive unit 38, which is triggered by the pulses from the oscillator 20. Thus, second gate unit 40 is closed at the time the transmitter circuit 28 excites the transducer 30.

Figure 2:
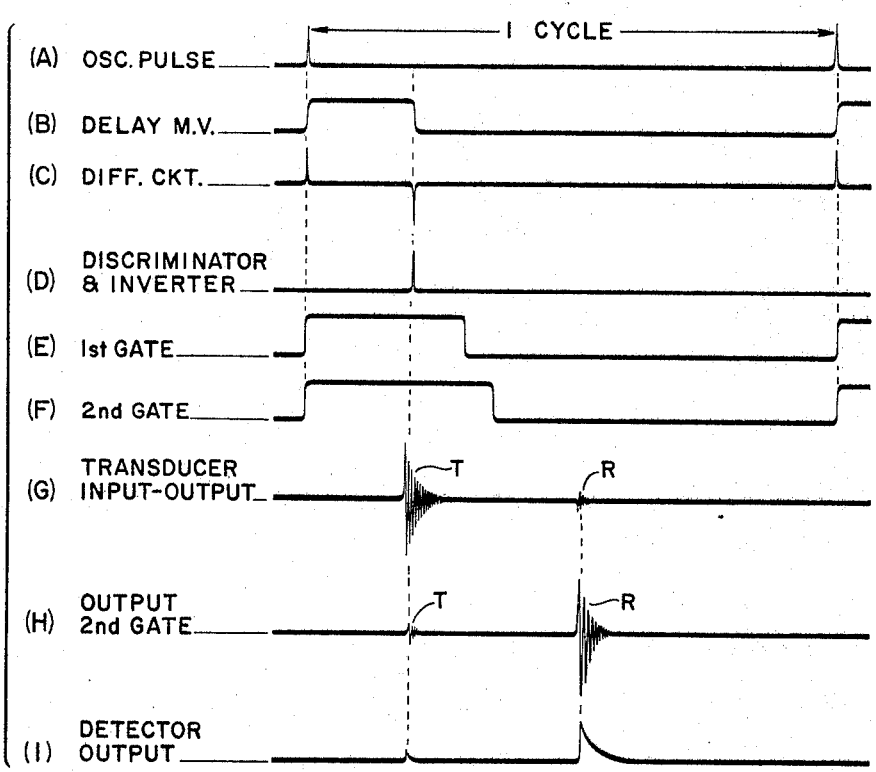
FIGURES 2(A)–2(I) are diagrammatic illustrations of the waveforms which appear in the block diagram of FIGURE 1.

As shown in FIGURE 2(H), the output of the second gate 40 includes an amplified received pulse R which is now very much larger than the transmitter crossfeed T and the signal-to-noise ratio is significantly improved.

The output of second gate 40 is amplified in high gain amplifier 42 and then fed to a detector circuit 44, which rectifies and smooths the received waveform to generate essentially its envelope (FIGURE 2(I)). The detected output signal is then applied to a cable driver circuit 46 which is coupled to a logging cable.

Since the present invention significantly improves the signal-to-noise ratio in the receiver channel, maximum amplification of the received signal may be performed prior to the detector circuit 44. This is desirable because detector circuit 44 has a minimum threshold operating level. Any received signal having an amplitude below this threshold level will not be detected. Heretofore, because of the low signal-to-noise ratio caused by transmitter crossfeed, high gain amplification could only be done following the detector circuit. Consequently, weak received signals falling below the detector threshold level were not detected.

Figure 3:
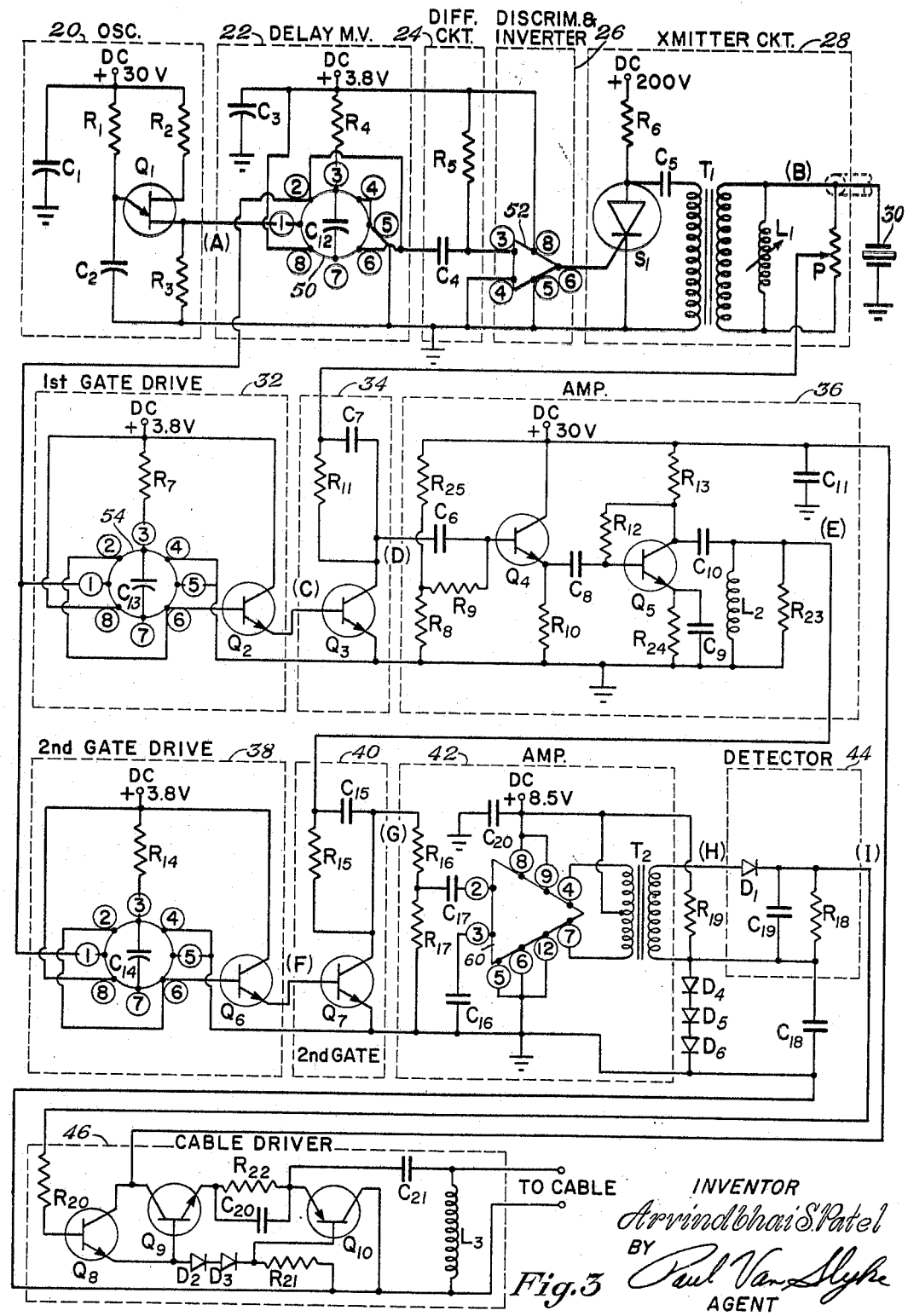
FIGURE 3 is a design example of a circuit schematic for the block diagram of FIGURE 1.

Design example—FIGURE 3

In FIGURE 3 is shown a design example of a circuit schematic for the block diagram of FIGURE 1. The illustrated circuit has a gain of 5,000 and a dynamic range of 200. Waveforms which appear at the lettered points in the circuit schematic of FIGURE 3 are shown in FIGURES 4(A)–4(I).

The oscillator 20 is shown as a relaxation oscillator comprised of a unijunction transistor $Q_1$. An oscillation frequency of 2 kilohertz is determined by the values of resistor $R_1$ and capacitor $C_2$.

Pulses from the oscillator 20 are used to trigger the delay multivibrator 22 which includes an integrated circuit module 50. Module 50 is a Fairchild $\mu$L914 Dual Two Input Gate available from Fairchild Semiconductor, 313 Fairchild Drive, Mountain View, Calif. It is connected as shown in the drawing to provide a monostable multivibrator. The time constant of the multivibrator, which is set by the value of resistor $R_4$ and capacitor $C_{12}$, is 17 microseconds.

The rectangular pulse waveform from delay multivibrator 22 is coupled into the differentiating circuit 24 through capacitor $C_4$. Differentiation of the square pulse is achieved by capacitor $C_4$ and resistor $R_5$ to produce a positive-going spike from the leading edge of the input square pulse and a negative-going spike from the trailing edge.

The output of the differentiating circuit 24 is fed to pin 3 of an integrated circuit module 52, which comprises the discriminator and inverter circuit 26. Module 52 is also a Fairchild $\mu$L914 as described above, but it is connected as shown in the drawing to provide rectification of the negative input spikes and elimination of the positive spikes. The output of the circuit 26 appearing at pin 6 of module 52 is a series of positive spikes which are delayed 17 microseconds from the corresponding pulse from the output of oscillator 20.

The delayed pulses from circuit 20 are used to trigger the transmitter circuit 28. Transmitter circuit 28 includes a capacitor $C_5$ which retains a charge of 200 volts from the 200-volt D.C. supply. When triggered by a delayed pulse from circuit 26, a silicon controlled rectifier $S_1$ (SCR) becomes conducting, thereby permitting capacitor $C_5$ to discharge to ground. The voltage generated by the discharge of $C_5$ is coupled through transformer $T_1$ to excite the transducer 30 to generate an acoustic pulse of 1.3 megahertz peak frequency. Variable inductor $L_1$ is provided to tune the excitation of transducer 30.

As shown in FIGURE 4(B) the transmitter excitation is 200 volts peak to peak. Since the transducer 30 also functions as a receiver, the transmitter excitation crossfeeds into the receiver channel which is connected to the tap of potentiometer P. The received signal from transducer 30 is coupled from the tap of potentiometer P into the first gate circuit 34 through a network including resistor $R_{11}$ and capacitor $C_7$. Resistor $R_{11}$ presents a high D.C. input impedance to prevent loading down of the gate. The A.C. component of the signal is passed through capacitor $C_7$. Gate circuit 34 is normally open, but is closed by the operation of the first gate drive circuit 32 during the period of transmitter excitation.

The first gate drive unit 32 consists of an integrated circuit module 54 which is a Fairchild $\mu$L914 as described above. Module 54 is connected as shown to provide a monostable multivibrator which is triggered by a pulse taken from pin 2 of module 50 in multivibrator 22. The pulse from module 50 is used for triggering rather than the pulse from oscillator 20 because of its faster rise time. The time constant of the multivibrator provided by module 54 is set for 25 microseconds by the values of the resistor $R_7$ and capacitor $C_{13}$. An emitter follower stage comprised of transistor $Q_2$ couples the high impedance output of the module circuit 54 to the low impedance of the gate circuit 34.

Transistor $Q_3$ in gate circuit 34 is normally non-conducting, but is biased to saturation by the gating waveform (FIGURE 4(C)) from the first gate drive circuit 32. In the presence of this gating waveform, transistor $Q_3$ passes the transmitter crossfeed to ground. When biased to saturation, transistor $Q_3$ has a small collector-to-emitter voltage drop. The portion of transmitter crossfeed having amplitude below this voltage drop will leak through the gate. As soon as the gating waveform from the drive circuit 32 terminates, transistor $Q_3$ again becomes nonconducting.

Note in FIGURE 4(D) that the operation of the gate circuit 32 caused some high voltage gating spikes which are large compared to the received signal. Note also that the transmitter crossfeed which leaked through the gate is still very much larger than the received signal.

The output of gate 34 is coupled through capacitor $C_6$ into an emitter follower input stage including transistor $Q_4$. The amplifying stage includes a transistor $Q_5$ connected in conventional grounded emitter configuration. The final stage of amplifier circuit 36 is a tuned network consisting of capacitor $C_{10}$, inductor $L_2$, and resistor $R_{23}$. $C_{10}$ and $L_2$ pass frequencies equal to the transmitted frequencies and filter out all others. Resistor $R_{23}$ damps out any oscillation across inductor $L_2$.

As shown in FIGURE 4(E), the amplified received signal has now been amplified to a perceptible level but is still very small compared to the gating spikes and transmitter crossfeed which were also amplified.

The signal from amplifier 36 is coupled through the network including resistor $R_{15}$ and capacitor $C_{15}$ into the second gate circuit 40 which is identical to the first gate circuit. Gate circuit 40 is closed by the gating waveform (FIGURE 4(F)) from the second gate drive circuit 38. Drive circuit 38 is identical to drive circuit 32 except that resistor $R_{14}$ and capacitor $C_{14}$ are selected to give a gating waveform duration of 120 microseconds. In the presence of the gating waveform from drive circuit 38, transistor $Q_7$ becomes conducting, thereby passing to ground the bulk of transmitter crossfeed and gating spikes from the output of the first gate circuit.

As shown in FIGURE 4(G), the output of the second gate circuit has a greatly improved signal-to-noise ratio. The received signal is now approximately 0.4 volt peak to peak and the signal-to-noise ratio is on the order of 200 to 1.

The signal from gate circuit 40 is coupled through a voltage divider network including resistors $R_{16}$ and $R_{17}$ into a high gain amplifier 42. The voltage divider network is used to attenuate the gating spikes caused by the gate circuits 34 and 40, thus allowing the maximum gain of amplifier 42 to be used to amplify the received signal. The amplifying stage includes an integrated circuit module 60, which is type CA-3020 available from the Radio Corporation of America, Harrison, N.J. Module 60 is connected as shown in the drawing to provide a gain of approximately 100.

The output of amplifier 42 is coupled through a step-up transformer $T_2$ with the turn ratio 1 to 4 into the detector circuit 44. Diode $D_1$ passes the positive-going portion of the signal. This positive-going portion is integrated and smoothed by capacitor $C_{19}$ and resistor $R_{18}$ to produce the envelope of the positive portion of the received signal.

The detected signal is coupled through resistor $R_{20}$ to the cable driver circuit 46 whose primary purpose is to match the high impedance from the output of amplifier 32 to the low impedance of a logging cable. Cable drive circuit 46 includes at the input stage a transistor $Q_8$ connected in an emitter follower configuration. The output stage is a complementary follower stage including transistors $Q_9$ and $Q_{10}$. The network including capacitor $C_{20}$ and resistor $R_{22}$ limits the current flowing through transistors $Q_9$ and $Q_{10}$. Inductor $L_3$ and capacitor $C_{21}$ are provided to damp out low frequency oscillations.

Diodes $D_2$ and $D_3$ are connected in the load circuit of transistor $Q_8$ to provide bias for transistors $Q_9$ and $Q_{10}$. Resistor $R_{21}$ provides the load for transistor $Q_{10}$.

The purpose of diodes $D_4$, $D_5$, and $D_6$ is to provide bias for the transistor $Q_8$. The bias voltage provided by these three diodes is filtered by capacitor $C_{18}$. The current to maintain diodes $D_1$, $D_2$, and $D_3$ in saturation is provided from the 8.5 volt bias supply through resistor $R_{19}$.

The detected waveform (FIGURE 4(I)) applied to the cable driver circuit 46 has a peak voltage of approximately 100 volts and a signal-to-noise ratio of on the order of 200 to 1. This is to be contrasted with the waveform of FIGURE 4(B) where the received waveform is on the order of microvolts and the transmitter crossfeed is 200 volts peak to peak.

Parts list—FIGURE 3

The following is a parts list for the design example of FIGURE 3:

RESISTORS

| | |
|---|---|
| $R_1$ | 12 kilohms. |
| $R_2$, $R_{12}$ | 220 ohms. |
| $R_3$ | 47 ohms. |
| $R_4$, $R_7$, $R_5$ | 2.2 kilohms. |
| $R_6$ | 68 kilohms. |
| $R_8$ | 10 kilohms. |
| $R_9$ | 100 kilohms. |
| $R_{10}$ | 1 kilohm. |
| $R_{11}$, $R_{15}$ | 27 kilohms. |
| $R_{13}$ | 4.7 kilohms. |
| $R_{14}$, $R_{19}$ | 2.2 kilohms. |
| $R_{16}$ | 2.7 kilohms. |
| $R_{17}$, $R_{22}$ | 100 ohms. |
| $R_{18}$ | 180 kilohms. |
| $R_{20}$ | 120 kilohms. |
| $R_{21}$ | 2.7 kilohms. |
| $R_{23}$ | 4.7 kilohms. |
| $R_{24}$ | 150 ohms. |
| $R_{25}$ | 15 kilohms. |

CAPACITORS

| | |
|---|---|
| $C_1$, $C_{11}$, $C_3$, $C_{18}$ | 30 microfarads. |
| $C_2$ | 0.05 microfarad. |
| $C_4$ | .0033 microfarad. |
| $C_5$ | 0.0068 microfarad. |
| $C_6$ | 500 picofarads. |
| $C_7$, $C_{19}$ | 50 picofarads. |
| $C_8$ | .001 microfarad. |
| $C_9$, $C_{16}$ | 1 microfarad. |
| $C_{10}$ | 100 picofarads. |
| $C_{12}$ | .01 microfarad. |
| $C_{13}$ | .022 microfarad. |
| $C_{14}$ | 0.068 microfarad. |
| $C_{15}$ | 300 picofarads. |
| $C_{17}$ | .0047 microfarad. |
| $C_{20}$, $C_{21}$ | 5 microfarads. |

TRANSISTORS

| | |
|---|---|
| $Q_1$ | 2N491. |
| $Q_2$, $Q_4$, $Q_5$, $Q_6$, $Q_8$, $Q_9$ | 2N2102. |
| $Q_3$, $Q_7$ | 2N3011. |
| $Q_{10}$ | 2N1132. |

TRANSFORMERS

| | |
|---|---|
| $T_1$ | United Transformer Corp., Type H63. |
| $T_2$ | Core Type 5B8001 from Magnetic Metals Co., hand wound with 1 to 4 turn ratio. |

INDUCTORS

| | |
|---|---|
| $L_1$ | 15–30 microhenrys. |
| $L_2$, $L_3$ | 1 millihenry. |

POTENTIOMETER

| | |
|---|---|
| P | 5 kilohms maximum. |

Figure 5:
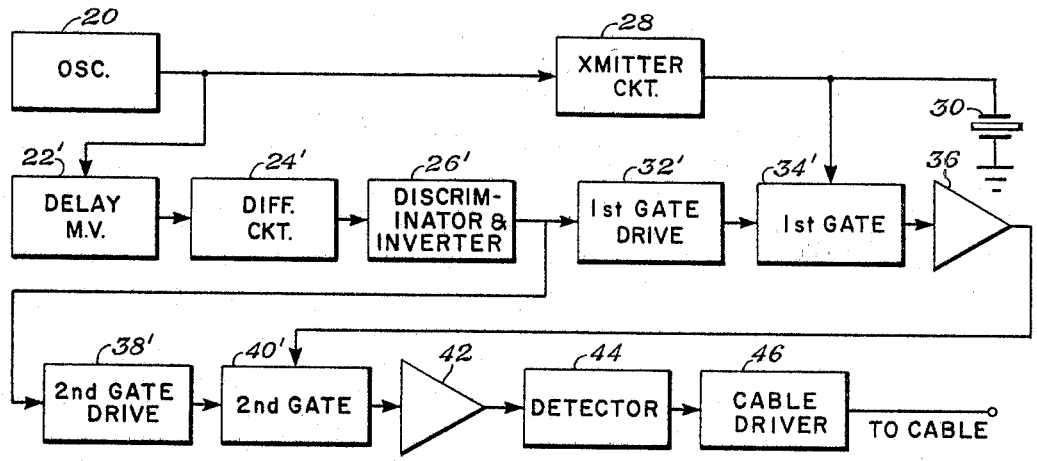
FIGURE 5 is a block diagram of another form of the invention employing normally closed gates.

Block diagram—FIGURE 5

Referring to FIGURE 5, there will be described a modification of FIGURE 1, employing normally closed gate circuits.

In this form of the invention, first and second gate circuits 34' and 40' are normally closed to attenuate transmitter crossfeed and other noise and are opened only during the time of the received signal. This is accomplished by delaying the pulses (FIGURE 6(A)) from oscillator 20 from closing gate circuits 34' and 40' for a period of time until after the transmitter is fired. More specifically, when the oscillator 20 produces a pulse, transmitter circuit 28 is triggered to excite instantaneously transducer 30 to produce an acoustic pulse. Delay multivibrator 22' is triggered by the same pulse from oscillator 20 to produce a rectangular delay pulse (FIGURE 6(B)), which is fed to differentiating circuit 24'. Differentiating circuit 24' produces a positive-going spike from the leading edge of the input square wave and a negative-going spike from the trailing edge (FIGURE 6(C)). The discriminator and inverter circuit 26' then inverts all of the negative-going and rejects the positive-going spikes (FIGURE 6(D)). Thus, there is produced from the output of circuit 26' a string of pulses which is delayed in time from the corresponding oscillator pulses for a period of time equal to the time constant of delay multivibrator 22'.

Figure 6:
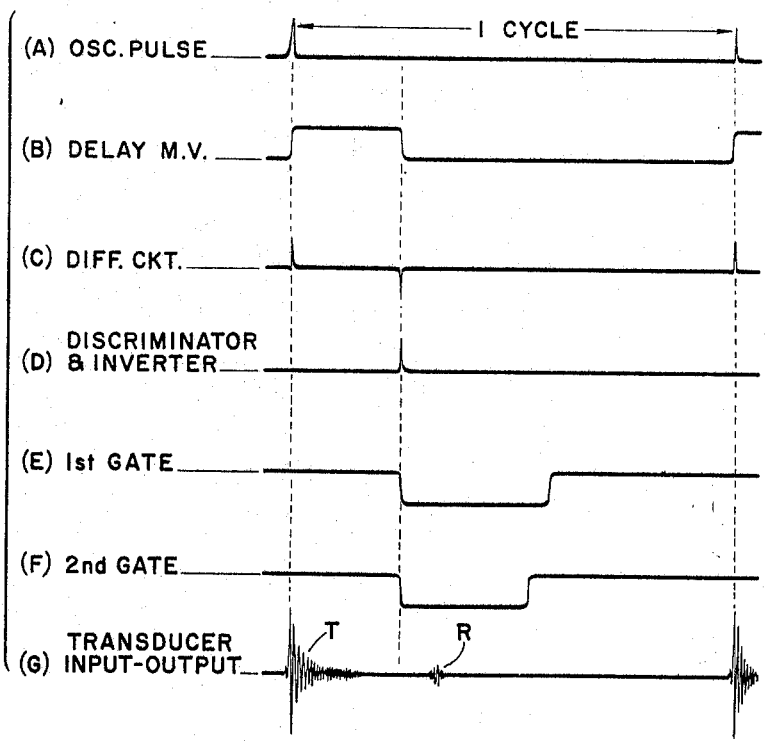
FIGURES 6(A)–6(G) are diagrammatic illustrations of the waveforms which appear in the block diagram of FIGURE 5.

The delayed pulses from the output of circuit 26' are used to trigger a first gate drive circuit 32' to generate a first gating waveform (FIGURE 6(E)) during which the first gate circuit 34' is opened. The output of the first gate circuit 34' is amplified in amplifier 36 and fed to a second gate circuit 40'. Second gate circuit 40' is opened to pass the received signal in the presence of the second gate waveform (FIGURE 6(F)) generated by the second gate drive circuit 38'. Second gate drive circuit 38' is also triggered by the negative-going trailing edge of the rectangular pulse from the output of multivibrator 22'.

The duration of the second gating waveform (FIGURE 6(F)) is made slightly shorter than the duration of the first gate waveform (FIGURE 6(E)) so that any gating spikes caused by the gating circuit 34' will be blocked by the second gate 40'.

By use of normally closed first and second gate circuits, it is not necessary to delay the excitation of the transducer. Instead, the gate circuits are maintained normally closed and are delayed in opening until after the transmitter crossfeed has been gated out.

The invention claimed is:

1. In a borehole logging system including at least a logging tool adapted to be passed through a borehole, a transmit-receive electroacoustic transducer in the logging tool, a receiver channel coupled to the transducer, a transmitter circuit coupled to the transducer to provide transmitter excitation,
   the improvement for reducing the crossfeed of transmitter excitation from the transmitter circuit into the receiver channel which comprises:
   (a) a first gate circuit in the logging tool connected in the receiver channel;
   (b) a second gate circuit in the logging tool connected in series in the receiver channel with the first gate circuit;
   (c) means in the logging tool coupled between the transmitter circuit and the first gate circuit for controlling the operation of the first gate circuit to pass the received signal from the transducer but attenuate transmitter crossfeed;
   (d) an amplifier in the logging tool connected in the receiver channel between the first and second gate circuits for amplifying the received signal from the output of the first gate circuit and any transmitter crossfeed that may have leaked through the first gate circuit; and
   (e) means in the logging tool coupled between the transmitter circuit and the second gate circuit for controlling the operation of the second gate circuit to pass the received signal and again attenuate transmitter crossfeed.

2. The system defined by claim 1 in which the second gate circuit is controlled in time to gate out any gating spikes caused by the operation of the first gate circuit.

3. The system defined by claim 1 further comprising:
   (a) a second amplifier circuit coupled to the output of the second gate circuit; and
   (b) detector circuit means coupled to the output of the second amplifier circuit for generating at least a portion of the envelope of the received signal.

4. The system defined by claim 1 wherein the first and second gate circuits are normally open to pass the received signal and are closed during the transmitter crossfeed.

5. The system defined by claim 1 wherein the first and second gate circuits are normally closed to attenuate transmitter crossfeed and other noise and are opened to pass the received signal.

6. In a borehole reflection logging system including at least a logging tool adapted to be passed through a borehole, a transmit-receive electroacoustic transducer in the logging tool, a receiver channel coupled to the transducer, a transmitter circuit coupled to the transducer to provide transmitter excitation, a pulse source for triggering the transmitter circuit,
   the improvement for reducing the crossfeed of transmitter excitation from the transmitter circuit into the receiver channel which comprises:
   (a) a first normally open gate circuit in the logging tool connected in the receiver channel;
   (b) a first gate drive circuit in the logging tool responsive to the pulse source for closing the first gate circuit during most of the transmitter crossfeed, thereby attenuating such crossfeed;
   (c) a delay circuit in the logging tool coupled between the pulse source and the transducer for delaying the excitaiton of the transducer until after the first gate circuit is substantially closed;
   (d) an amplifier circuit in the logging tool connected in the receiver channel to the output of the first gate circuit;
   (e) a second normally open gate circuit in the logging tool connected in the receiver channel to the output of the amplifier circuit; and
   (f) a second gate drive circuit in the logging tool responsive to the pulse source for closing the second gate circuit during most of the transmitter crossfeed to again attenuate such crossfeed and improve the ratio of reflected signal to crossfeed.

7. The system defined by claim 6 further comprising:
   (a) a second amplifier circuit; and
   (b) a voltage divider network which couples the second amplifier circuit to the output of the second gate circuit and provides for attenuation of any gating spikes caused by the first and second gate circuits.

8. The system defined by claim 7 further comprising: a detector circuit means coupled to the output of the second amplifier circuit for generating at least a portion of the envelope of the received signal.

9. The system defined by claim 6 in which the delay circuit includes:
(a) a monostable multivibrator, the input of which is coupled to the pulse source;
(b) a differentiating circuit coupled to the output of the monostable multivibrator; and
(c) a discriminator and inverter circuit which inverts the negative voltage spikes produced by the differentiating circuit and rejects the positive voltage spikes to generate a series of delayed voltage spikes for excitation of the transducer.

10. The system defined by claim 6 in which the second gate drive circuit maintains the second gate circuit closed for a longer period of time than the first gate circuit is closed, thereby attenuating any gating spikes caused by the reopening of the first gate circuit.

11. The system defined by claim 6 in which the first and second gate drive circuits each include a monostable multivibrator.

12. The system defined by claim 8 in which the delay circuit includes:
(a) a monostable multivibrator, the input of which is coupled to the pulse source;
(b) a differentiating circuit coupled to the output of the monostable multivibrator; and
(c) a discriminator and inverter circuit which inverts the negative voltage spikes produced by the differentiating circuit and rejects the positive voltage spikes to generate a series of delayed voltage spikes for excitation of the transducer.

13. The system defined by claim 8 in which the second gate drive circuit maintains the second gate circuit closed for a longer period of time than the first gate circuit is closed, thereby attenuating any gating spikes caused by the reopening of the first gate circuit.

14. The system defined by claim 8 in which the first and second gate drive circuits each include a monostable multivibrator.

15. In a borehole reflection logging system including at least a logging tool adapted to be passed through a borehole, a transmit-receive electroacoustic transducer in the logging tool, a receiver channel coupled to the transducer, a transmitter circuit coupled to the transducer to provide transmitter excitation, and means for rotating the transducer, the improvement for reducing the crossfeed of transmitter excitation from the transmitter circuit into the receiver channel which comprises:
(a) a first gate circuit in the logging tool connected in the receiver channel;
(b) a second gate circuit in the logging tool connected in series in the receiver channel with the first gate circuit;
(c) means in the logging tool coupled between the transmitter circuit and the first gate circuit for controlling the operation of the first gate circuit to pass the received signal from the transducer but attenuate transmitter crossfeed;
(d) an amplifier in the logging tool connected in the receiver channel between the first and second gate circuits for amplifying the received signal from the output of the first gate circuit and any transmitter crossfeed that may have leaked through the first gate circuit; and
(e) means in the logging tool coupled between the transmitter circuit and the second gate circuit for controlling the operation of the second gate circuit to pass the received signal and again attenuate transmitter crossfeed.

16. The system defined by claim 15 in which the second gate circuit is controlled in time to gate out any gating spikes caused by the operation of the first gate circuit.

17. The system defined by claim 15 further comprising:
(a) a second amplifier circuit coupled in the logging tool to the output of the second gate circuit; and
(b) detector circuit means in the logging tool coupled to the output of the second amplifier circuit for generating at least a portion of the envelope of the received signal.

References Cited

UNITED STATES PATENTS

| 3,082,837 | 3/1963 | Summers | 181—0.5 |
| 3,093,811 | 6/1963 | Schneider | 181—0.5 |
| 3,304,538 | 2/1967 | Zill | 340—18 |

BENJAMIN A. BORCHELT, Primary Examiner

J. FOX, Assistant Examiner

U.S. Cl. X.R.

340—18